(12) United States Patent
Ahm

(10) Patent No.: US 7,614,181 B2
(45) Date of Patent: Nov. 10, 2009

(54) SEED TAPE INCLUDING SUCCESSIVELY ARRANGED GERMINATING UNITS

(76) Inventor: Poul Henrik Ahm, Edf. Mar Bella, Atico A, Calle San Pedro, 43, E-03590 Altea (Alicante) (ES)

( * ) Notice: Subject to any disclaimer, the term of this patent is extended or adjusted under 35 U.S.C. 154(b) by 730 days.

(21) Appl. No.: 10/563,472

(22) PCT Filed: Jul. 2, 2004

(86) PCT No.: PCT/DK2004/000472

§ 371 (c)(1),
(2), (4) Date: Jan. 4, 2006

(87) PCT Pub. No.: WO2005/002318

PCT Pub. Date: Jan. 13, 2005

(65) Prior Publication Data

US 2006/0156623 A1 Jul. 20, 2006

(30) Foreign Application Priority Data

Jul. 4, 2003 (DK) .......................... PA 2003 01020

(51) Int. Cl.
*A01C 1/04* (2006.01)
(52) U.S. Cl. .......................................................... 47/56
(58) Field of Classification Search ...................... 47/14, 47/15, 56
See application file for complete search history.

(56) References Cited

U.S. PATENT DOCUMENTS

| 526,512 A | * | 9/1894 | Weber | 47/56 |
| 5,372,882 A | * | 12/1994 | Peiffer et al. | 428/34.9 |
| 6,460,473 B1 | * | 10/2002 | Onodera et al. | 111/199 |
| 6,701,664 B2 | * | 3/2004 | Ahm | 47/56 |
| 6,735,902 B1 | * | 5/2004 | Ahm | 47/56 |
| 2006/0156623 A1 | * | 7/2006 | Ahm | 47/56 |

* cited by examiner

Primary Examiner—Francis T Palo
(74) Attorney, Agent, or Firm—Cooper & Dunham LLP

(57) ABSTRACT

A seed tape includes successively arranged germinating units including at least one carrier strip and at least one auxiliary layer of biodegradable, flexible, non-woven or film-like material arranged on the carrier strip, whereby the auxiliary layer is locally interrupted a short distance along the seed tape, and whereby each germinating unit includes a mixture of granulated carrier, at least one granulated additive and an adjuvant in addition to one or more seeds. The mixture plus the seed(s) are kept together to form at least one core portion including an incision, in the germinating unit, and whereby the seed tape can be cut into separate germinating units prior to irrigation and/or bedding out, the core portion made of the mixture including locally adhered fibers of one or more thermoplastic materials which form a coherent, open network for keeping the granules of the mixture together. The fibers of one or more thermoplastic materials which form the network are bicomponent fibers, and the seed or seeds is/are placed in the incision in the core portion, the incision being of a depth of 25 to 50% of a thickness of the core portion. An outer component of each bicomponent fiber is made of polyactide (derived from lactic acid) (PLA) having a relatively low melting point, whereas an inner component of the fiber is made of polyactide (derived from lactic acid) (PLA) having a relatively high melting point.

17 Claims, 4 Drawing Sheets

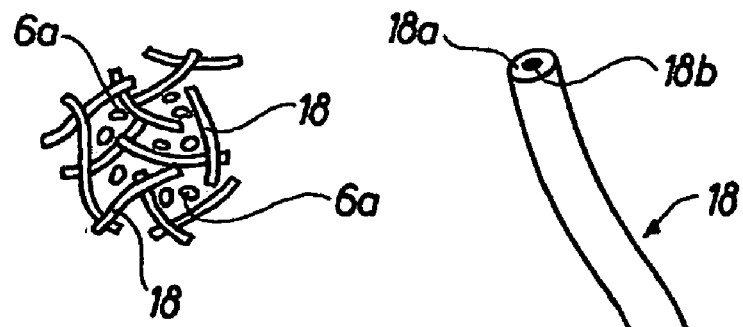
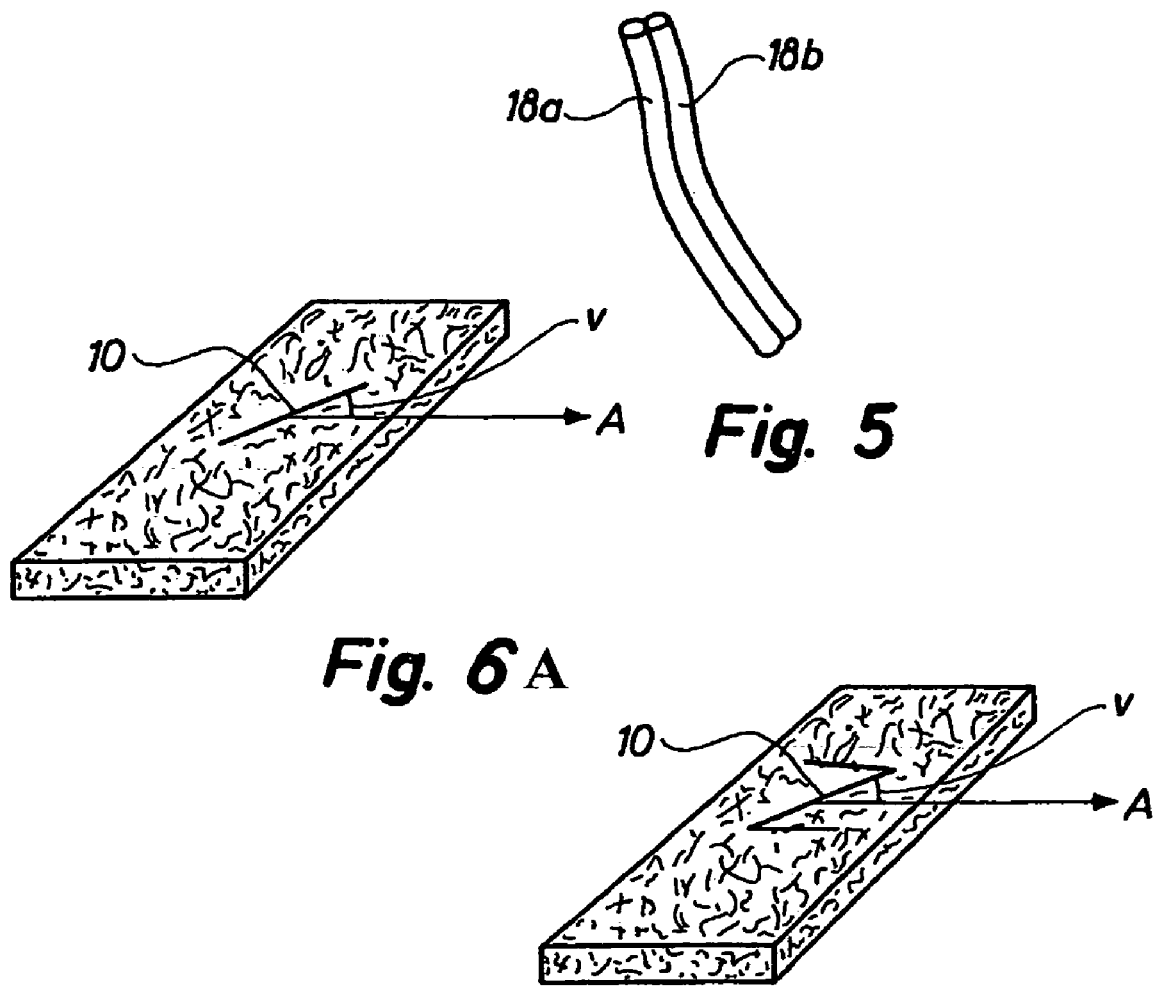

SEED TAPE INCLUDING SUCCESSIVELY ARRANGED GERMINATING UNITS

TECHNICAL FIELD

The invention relates to a seed tape including successively arranged germinating units, and which further includes at least one carrier strip as well at least one auxiliary layer of biodegradable, flexible, non-woven or film-like material arranged on said carrier strip, whereby the auxiliary layer is locally interrupted a short distance along the seed tape, and whereby each germinating unit includes a mixture of granulated carrier and at least one granulated additive and adjuvant in addition to one or more seeds, said mixture plus the seed(s) being kept together to form at least one core portion in the germinating unit, as well as whereby said seed tape can be cut into separate germinating units prior to the irrigation and/or the bedding out, said core portion made of said mixture including locally adhered fibres of one or more thermoplastic materials which form a coherent, open network for keeping the granules of the mixture together.

BACKGROUND ART

The term "carrier" is here to be construed as a material including at least one of the substances: granulated expanded vermiculite, perlite, zeolite, cellulose materials, such as wood fibres and sphagnum, burned clay, rock wool or the like substances, whereby it is possible to obtain a desired degree of water conveying capacity, ion exchanging properties etc.

The term "additive" is here primarily to be construed as water-absorbing materials, such as superabsorbing materials, i.e. absorption of $H_2O$ in order to achieve a moisture buffer, such as for instance superabsorbing polymers (SAP).

The expression "adjuvant" should here be understood so as to cover one or more substances selected among plant nutrients, plant protectants, such as pesticides, including herbicides, insecticides, especially systemic insecticides, fungicides, virae, cultures of bacteria, cultures of fungi, such as Trikoderma, fungus spores, microencapsulated fungicides, eggs from useful insects, such as predatory nematodes, fertilizers, enzymes, animal repellents, hormones, pH-adjusting agents, activated carbon, clay particles, trace elements, such as molybdenum, wood fibres or wood powder, kieselguhr, surfactants or other substances with a favourable effect on the germination and the growth of plants, where several substances are available in microencapsulated form.

The expression "biodegradable" material is here to be construed as a material gradually disintegrating and/or being part of the ordinary biological food chain within a measurable period when left alone in its natural state.

The handling of seed tapes is often encumbered with the problem that the carrier, the additives and the possible adjuvants have a tendency to sift out of the individual germinating units, viz. the pockets, which presents a rather disadvantageous feature because a careful control of the pesticides inserted, such as for instance Gaucho, is actually desired. In addition, extra care should be taken that the materials being inserted in the germinating units remain in the initial locations because the manufacturing of such seed tapes must be carried out at a very high speed, viz. several hundred m/min.

WO 00/00007A relates to a seed tape including successively arranged germinating units, and which further includes at least one carrier strip as well as at least one auxiliary layer of biodegradable, flexible, non-woven or film-like material arranged on said carrier strip; each germinating unit includes a mixture of granulated carrier, at least one granulated additive in addition to one or more seeds, said mixture plus the seeds being kept together to form at least one core portion in the germinating unit; the core portion made of said mixture includes locally adhered fibres of one or more thermoplastic materials which form a coherent, open network for keeping the granules of the mixture together. As the seed tape is moved with high speed it would be advantageous if a more reliable retention of the carrier, additives and the possible adjuvants in each germinating unit could be obtained.

U.S. Pat. No. 5,372,885 relates to a method of making bicomponent fibres. The document describes high performance bicomponent fibres made out of thermoplastic materials. By using these fibres as binder fibres the efficiency of the binding in the mixture would be certainly improved but not enough.

DISCLOSURE OF INVENTION

The object of the invention is to provide a seed tape of the above type which ensures a particularly reliable retention of the carrier, the additives and the possible adjuvant in each germinating unit.

The seed tape according to the invention is characterised in that the core portion made of the above mixture includes locally adhered bicomponent fibres of one or more thermoplastic materials which form a coherent, open network for keeping the granules of the mixture and possibly also one or more seeds together and in that one or more seeds are placed in an incision in the core portion, said incision preferably being of a depth of 25 to 50%, especially 33 to 40% of the thickness of said core portion. As a result, the carrier, the additives, i.e. in particular pesticides and possible adjuvant(s) is/are in a particular efficient way retained in the network whereby the sifting tendency has been minimized. The seed tape is suited for a manufacturing procedure at very high speeds involving significant stress loads caused by strong accelerations/decelerations of the seed tape. Also the seed(s) is/are especially well protected inside the core portion.

Moreover, the outer component of each bicomponent fibre may according to the invention be made of polylactide (derived from lactic acid) (PLA) having a relatively low melting point, whereas the inner component of said fibre may be made of polylactide (derived from lactic acid) (PLA) having a relatively high melting point. The resulting network is particularly reliable and biodegradable.

According to the invention the incision may form an angle of 40 to 65°, such as 45 to 55°, with the longitudinal axis of the seed tape, which turned out to be particularly advantageous.

Furthermore, the incision may according to the invention be substantially Z-shaped with the result that it is particularly easy to insert the seed into the core portion.

According to the invention, the carrier strip and/or the auxiliary layer may be made of a thermoplastic material, such as polypropylene or polylactide (derived from lactic acid) (PLA), said material preferably being of a weight of 15 to 30 $g/m^2$, especially 18 to 22 $g/m^2$, in particular 20 $g/m^2$. Such a material turned out to be particularly advantageous.

Further according to the invention the bicomponent fibres of polylactide (derived from lactic acid) (PLA) may form 4 to 9, especially 7 to 8% by weight of the mixture, whereas a superabsorbing polymer (SAP) may form 1 to 7% by weight, especially approximately 2.5% by weight of the mixture, and the rest may for instance be vermiculite or wooden dust. As a result, the core portion achieves a particularly good grip about the SAP granules.

Furthermore according to the invention the bicomponent fibres of the core portion and optionally also the carrier, the additive and the adjuvant, if any, may have been placed on the carrier strip by means of air. The resulting core portion is provided in a particularly simple way.

According to the invention, the seed(s) or the granules of the mixture may have been placed on the carrier strip or in the core portion by said seed(s) or granules being magnetized through a coating and thereby being attracted to the carrier strip or the core portion by means of small lumps or stripes of permanent-magnet-powder, such as strontium-barium-ferrite powder or titanium dioxide and barium ferrite powder, arranged on said carrier strip or on said core portion. In this manner a particularly reliable placing of the seed(s) or the granules in the seed tape is obtained.

Furthermore, the coating used on the seed(s) or the granules may according to the invention include starch, such as paste, or polymers as well as magnetic powder in form of iron powder for instance of a grain size of 17 to 23 μm, especially 20 μm, plus possible insecticides, fungicides or other adjuvants. The resulting positioning of the seeds or the granules in the seed tape is particularly accurate.

In addition, the carrier may according to the invention have been microencapsulated before it is placed in the core portion with the result that these substances are particularly well controlled.

In addition, when the carrier strip is made of paper and a second carrier strip is made of PLA and an auxiliary layer is made of paper or PLA, then the seed tape may according to the invention be characterised in that the auxiliary layer is secured to the PLA carrier strip by means of a pressure-sensitive or heat-sensitive glue, which has been applied onto the auxiliary layer preferably in advance. In this manner the seed tape can be manufactured in a particularly easy and fast manner.

Further each core portion may according to the invention include a recess in which one or more seeds is/are placed, said seed(s) being retained by means of glue or magnetic particles. In this manner each seed is ensured an accurate placing in the tape which is a vital factor in connection with a fully automated machinery bedding out.

BRIEF DESCRIPTION OF THE DRAWINGS

The invention is explained in greater detail below with reference to the accompanying drawings, in which FIG. 3 is an enlarged view of a portion of the bicomponent fibres of the network, FIG. 4 is a perspective view of a bicomponent fibre, where said bicomponent fibre is of the coaxial type, FIG. 5 is a perspective view of a bicomponent fibre, where the two components of the fibre are juxtaposed, FIG. 6A is a perspective view of a core portion, where an inclined incision in said core portion appears particularly clearly, and FIG. 6B is a perspective view of the core portion showing a Z-shaped incision.

BEST MODE FOR CARRYING OUT THE INVENTION

Figure 1:
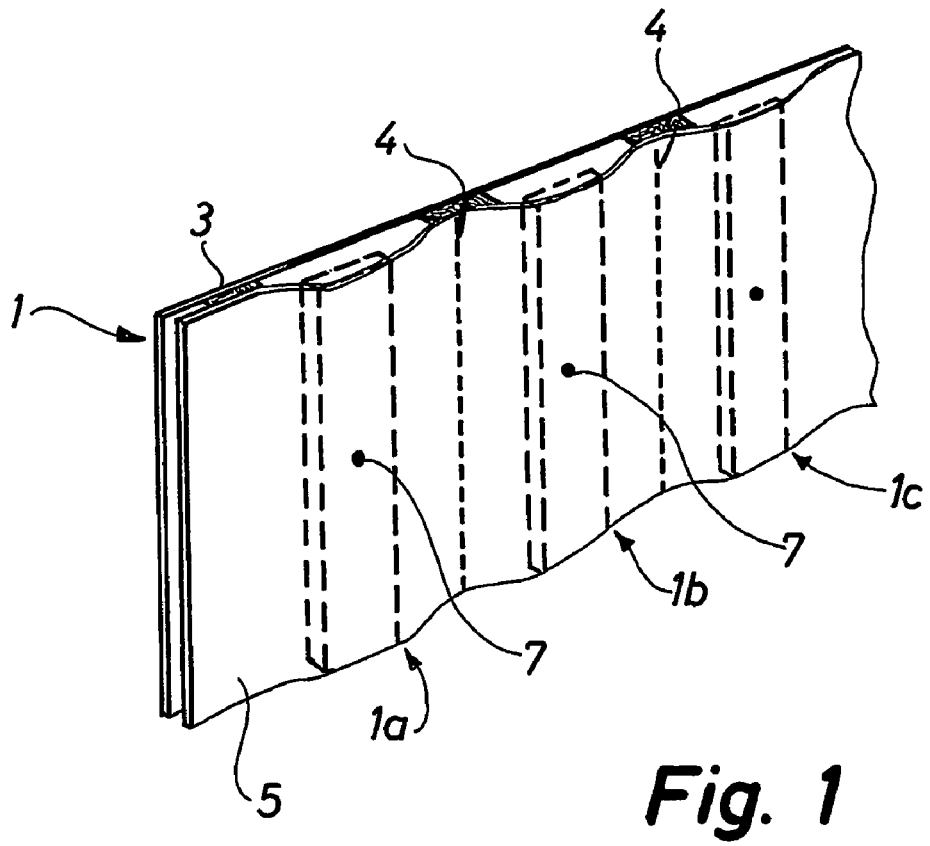
FIG. 1 is a perspective view of a portion of an embodiment of the seed tape according to the invention.

The seed tape of FIG. 1 includes many successively arranged germinating units, only the first three germinating units being designated a reference numeral, viz. 1*a*, 1*b* and 1*c*. As illustrated, the seed tape includes at least one carrier strip 3 as well as at least one auxiliary layer 5 of biodegradable, flexible, non-woven or film-like material and being placed on said carrier strip. The auxiliary layer 5 can be locally interrupted over a short distance along the seed tape, which, however, has not been illustrated. The carrier strip 3 and the auxiliary layer 5 can optionally be locally joined by means of transverse glue zones, one end of such a glue zone being indicated at 4.

In addition to one or more seeds 7, each germinating unit 1*a*, 1*b*, 1*c* includes a mixture of granulated carrier, at least a granulated additive and an adjuvant, cf. the previously mentioned of said substances. The mixture is kept together to form a core portion 8 in each germinating unit.

Ordinarily the seed tape is in form of one long tape during the drenching so as to allow the seeds to germinate and/or be bedded out, but nothing prevents the seed tape from being cut into separate germinating units prior to the drenching and/or the bedding out. The core portion 8 includes the above mixture as well as locally glued bicomponent fibres of one or more thermoplastic materials 8 which together form a coherent open network, cf. in particular at 8*a*. The network surrounds the granules 6*a* of the mixture in such a manner that said granules are retained in a specific position relative to the seed(s) 7. In addition, the network assists in maintaining the optimum water-air-balance about the seed, said balance usually corresponding to 75% of water and 25% of air for most types of seeds with the result that various gases can easily reach the seed and that detrimental gas, such as ethylene, can leave the seed and the adjacent surroundings before the germinating seed suffers from a detrimental effect.

Figure 2:
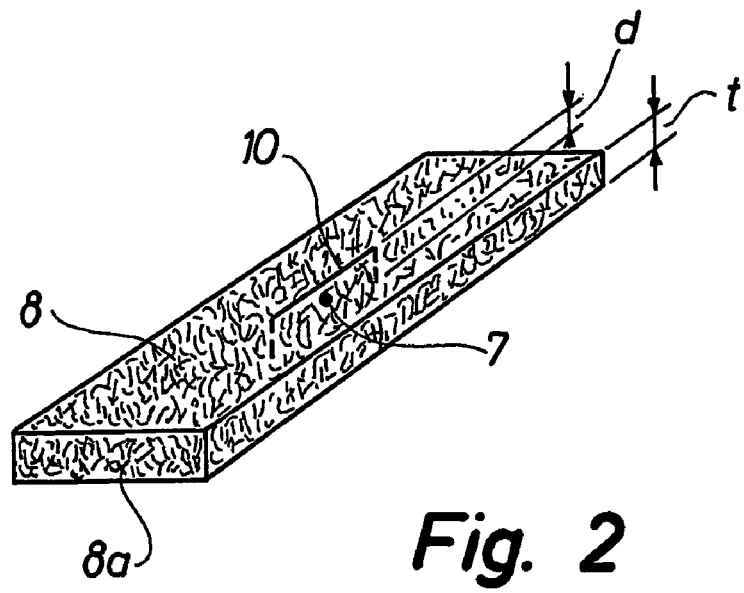
FIG. 2 is a perspective view of a core portion.

As illustrated in FIG. 2, one or more seeds are inserted in an incision 10 in the core portion 8. The incision 10 presents preferably a depth d of 25 to 50%, especially 33 to 40% of the thickness t of the core portion 8.

The thermoplastic material(s) of the bicomponent fibres 8*a* is/are biodegradable.

FIG. 4 illustrates how a bicomponent fibre 18 forming the network can be of the coaxial type where the outer component 18*a* of the fibre presents a lower melting point than the inner component 18*b*, preferably in such a manner that the outer component presents a melting point of approximately 110 to 130° C. and the inner component presents a melting point of approximately 160 to 300° C.

It should be noted that usually the seed(s) 7 is/are not inserted in the core portion 8 from the beginning because usually they cannot tolerate the temperatures to which said core portion must be heated in order to make the bicomponent fibres stick together.

Concerning the materials of the bicomponent fibres it should be noted that the outer component 18*a* of each fibre can for instance be made of polylactide (derived from lactic acid) (PLA) having a relatively low melting point whereas the inner component 18*b* of said fibre can be made of polylactide (derived from lactic acid) (PLA) having a relatively high melting point.

As shown in FIG. 6A, the incision 10 can form an angle v of 40 to 65 degrees and more particularly, 45 to 55 degrees, with the longitudinal axis A of the seed tape.

As shown in FIG. 6B, the incision 10 can be substantially Z-shaped.

The carrier strip 3 and/or the auxiliary layer 5 can be made of a thermoplastic material, such as polypropylene or polylactide (derived from lactic acid) (PLA), preferably of a weight of 15 to 30 g/m$^2$, especially 18 to 22 g/m$^2$, in particular 20 g/m$^2$. The core portion 8 can be secured to the carrier strip 3 and/or the auxiliary layer 5 by using the adhesiveness of the bicomponent fibres 18 and/or by means of an adhesive.

As far as the composition of the core portion is concerned it should be noted that the bicomponent fibres of polylactide (derived from lactic acid) (PLA) can form 4 to 9, especially 7 to 8% by weight of the above mixture, and the superabsorbing polymer (SAP) can form 1 to 7% by weight, especially 2.5% by weight of the mixture, whereas the remaining portion can be vermiculite or wooden dust.

Concerning the manufacture of the core portion 8 forming part of the seed tape, it should be noted that said core portion is made of a mixture which includes bicomponent fibres 18 and can have been heated to maximum approximately 125° C., such as by way of ultrasound or hot air, with the result that one component of the bicomponent fibre can be melted without the other fibre component being melted.

The bicomponent fibres 18 of the core portion 8 and optionally also the carrier, the additive and the adjuvant can be laid down on the carrier strip by means of air, which has not been illustrated.

Each core portion 8 can be provided by heating a mixture of bicomponent fibres 18, carrier, additive and adjuvant, where said mixture has then been cooled to form a "rod" not shown and from which each core portion 8 can be cut off. As a result, the seed tape can be manufactured at a particularly low price.

The seed(s) 7 as well as the granules 6a of the above mixture can be laid down on the carrier strip 3 or in the core portion 8 by said seed 7 or granules 6a being magnetized through a coating and thereby being attracted to the carrier strip 3 or the core portion 8 by means of small lumps or stripes of magnetic powder, in form of a strontium-barium-ferrite powder, optionally titanium dioxide and barium ferrite powder, arranged on said carrier strip 3 or on said core portion 8.

The coating used on the seed(s) or the granules can include starch, such as paste, or polymers as well as a magnetic powder in form of iron powder for instance of a grain size of 17 to 23 μm, especially 20 μm, plus possible insecticides, fungicides and other adjuvants.

The carrier has optionally been microencapsulated before it is inserted in the core portion 8.

Figure 7:
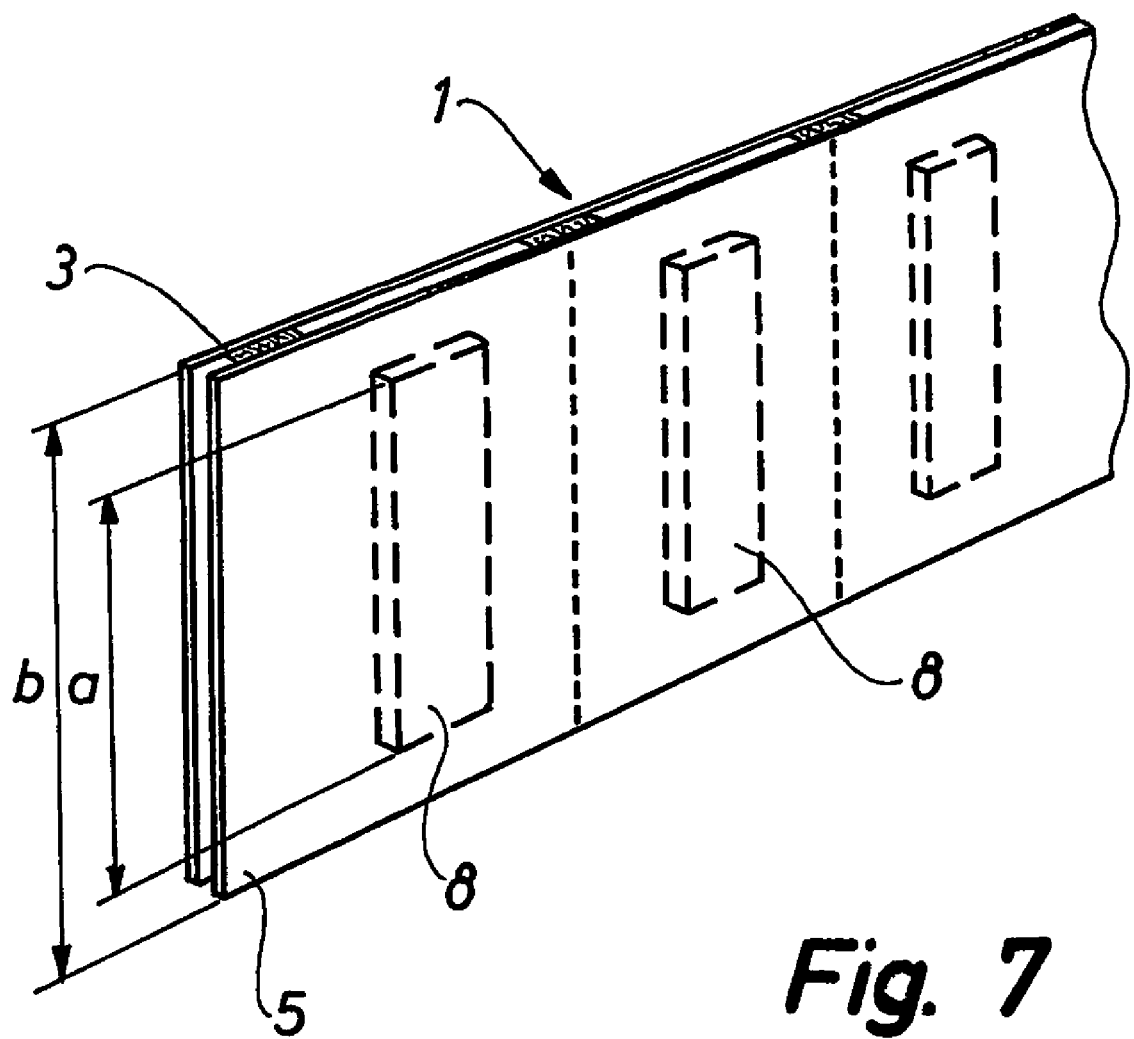
FIG. 7 illustrates a second embodiment of the seed tape according to the invention, where the length of each core portion is smaller than the width of the carrier strip of the seed tape.
Figure 8:
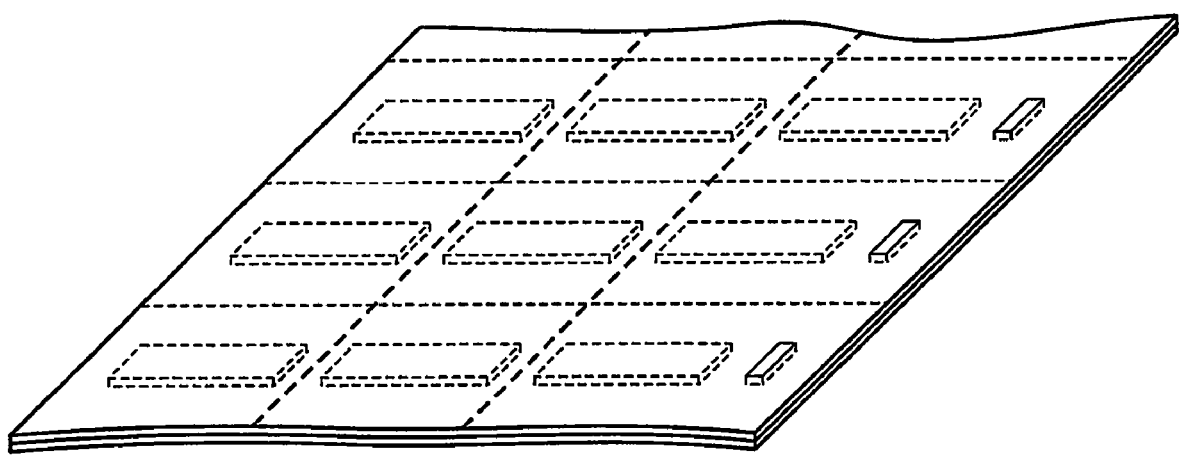
FIG. 8 is a perspective view of a web to be cut into juxtaposed seed tapes.

As illustrated in FIG. 7, the length a of the bicomponent fibre including the core portion 8 can be smaller than the width b of the carrier strip 23. The length a of the core portion is preferably maximum 80% of the width b of the carrier strip.

The invention may be modified in many ways without thereby deviating from the scope of the invention. Thus nothing prevents the seed tape from including two carrier strips 3 instead of one carrier strip 3 of PLA and an auxiliary layer 5 of PLA. One of these two carrier strips can for instance be made of PLA and two auxiliary layers 5 where one layer is made for instance of PLA and the other layer is made of for instance paper, and the other carrier strip can for instance be made of paper.

Correspondingly, the bicomponent fibres 18 and/or the carrier strip 3 and/or the auxiliary layer can be made of a polymer based on starch, cellulose or acrylate.

Nothing prevents the carrier strip 3 from being made of a biodegradable, flexible, non-woven or film-like material.

The above magnetic lumps and stripes on the carrier strip or the core portion can also be used as markers for marking the exact position of the core portions in connection with the production of the seed tape.

In the seed tape according to the invention, the carrier strip 3 can for instance be made of paper, a second carrier strip not shown can be made of PLA and an auxiliary layer 5 can be made of paper or PLA. The auxiliary layer 5 can be secured to the PLA carrier strip by means of a pressure-sensitive or heat-sensitive glue which has been applied onto said auxiliary layer 5 preferably in advance.

The individual germinating units 1a, 1b, 1c can be separated by means of at least one perforated line 4, preferably two relatively closely arranged perforated lines.

In said recess 10 the seed(s) 7 can be retained by means of glue or magnetic particles.

In the areas outside the core portions 8, the seed tape can present a thickness of 6 to mm, preferably 7 to 9 mm.

A web to be cut into juxtaposed seed tapes 1a, 1b, 1c can include a carrier strip 30 of PLA and an auxiliary strip 50 of paper before it is subjected to the cutting procedure, a row of core portions 8 being provided between said strips. The carrier strip 30 and the auxiliary strip 50 with the core portions 8 therebetween are such that the auxiliary strip 50 includes at least one longitudinal rim area 20 parallel to longitudinal edges of the carrier strip and projecting beyond at least one of said edges. At least one marker opening 52 can be shaped in the rim area opposite each row of core portions 8, said marker opening preferably being square and produced by way of punching.

The invention claimed is:

1. A seed tape comprising: successively arranged germinating units including at least one carrier strip and at least one auxiliary layer of biodegradable, flexible, non-woven or film-like material arranged on said carrier strip, whereby said auxiliary layer is locally interrupted a short distance along the seed tape, and whereby each germinating unit includes a mixture of granulated carrier, at least one granulated additive and an adjuvant in addition to one or more seeds, said mixture plus the seed(s) being kept together to form at least one core portion including an incision, in the germinating unit, and whereby said seed tape can be cut into separate germinating units prior to irrigation and/or bedding out, the core portion made of said mixture including locally adhered fibers of one or more thermoplastic materials which form a coherent, open network for keeping the granules of the mixture together, wherein the fibers of one or more thermoplastic materials which form the network are bicomponent fibers, and seed or seeds is/are placed in the incision in the core portion, said incision being of a depth of 25 to 50% of a thickness of said core portion, and wherein an outer component of each bicomponent fiber is made of polyactide (derived from lactic acid) (PLA) having a relatively low melting point, whereas an inner component of said fiber is made of polyactide (derived from lactic acid) (PLA) having a relatively high melting point.

2. A seed tape as claimed in claim 1, wherein the incision forms an angle of 40 to 65° with the longitudinal axis of the seed tape.

3. A seed tape as claimed in claim 2, wherein said angle is 45 to 55°.

4. A seed tape as claimed in claim 1, wherein the incision is substantially Z-shaped.

5. A seed tape as claimed in claim 1, wherein the carrier strip and/or the auxiliary layer are made of a thermoplastic material, said material being of a weight of 15 to 30 g/m$^2$.

6. A seed tape as claimed in claim 5, wherein said material has a weight of 18 to 22 g/m².

7. A seed tape as claimed in claim 5, wherein said material has a weight of 20 g/m².

8. A seed tape as claimed in claim 1, wherein the bicomponent fibers of the core portion and optionally also the carrier, the additive and the adjuvant, if any, have been placed on the carrier strip by means of air.

9. A seed tape as claimed in claim 1, wherein the seed(s) or the granules of the mixture has/have been placed on the carrier strip or in the core portion by said seed(s) or granules being magnetized through a coating and thereby being attracted to the carrier strip or the core portion by means of small lumps or stripes of permanent-magnet-powder arranged on said carrier strip or on said core portion.

10. A seed tape as claimed in claim 9, wherein the coating used on the seed(s) or the granules include starch or polymers as well as magnetic powder in form of iron powder, plus insecticides, fungicides or other adjuvants.

11. A seed tape as claimed in claim 9, wherein said small lumps or stripes of permanent-magnet-powder comprise strontium-barium-ferrite powder or titanium dioxide and barium ferrite powder.

12. A seed tape as claimed in claim 1, wherein the carrier has been microencapsulated before it is placed in the core portion.

13. A seed tape as claimed in claim 1, wherein the at least one carrier strip is made of paper, a second carrier strip is made of PLA, and the auxiliary layer is made of paper or PLA, and wherein the auxiliary layer is secured to the PLA carrier strip by means of a pressure-sensitive or heat-sensitive glue, which has been applied onto the auxiliary layer in advance.

14. A seed tape as claimed in claim 1, wherein in the incision (IP) in which one or more seed(s) is/are placed, said seed(s) is/are retained by means of glue or magnetic particles.

15. A seed tape as claimed in claim 1, wherein said incision is of a depth of 33 to 40% of the thickness of said core portion.

16. A seed tape comprising: successively arranged germinating units including at least one carrier strip and at least one auxiliary layer of biodegradable, flexible, non-woven or film-like material arranged on said carrier strip, whereby said auxiliary layer is locally interrupted a short distance along the seed tape, and whereby each germinating unit includes a mixture of granulated carrier, at least one granulated additive and an adjuvant in addition to one or more seeds, said mixture plus the seed(s) being kept together to form at least one core portion including an incision, in the germinating unit, and whereby said seed tape can be cut into separate germinating units prior to irrigation and/or bedding out, the core portion made of said mixture including locally adhered fibers of one or more thermoplastic materials which form a coherent, open network for keeping the granules of the mixture together, wherein the fibers of one or more thermoplastic materials which form the network are bicomponent fibers, and the seed or seeds is/are placed in the incision in the core portion, said incision being of a depth of 25 to 50% of the a thickness of said core portion, wherein the bicomponent fibers of polylactide (derived from lactic acid) (PLA) form 4 to 9% by weight of the mixture, whereas a superabsorbing polymer (SAP) forms 1 to 7% by weight of said mixture.

17. A seed tap as claimed in claim 16, wherein said biocomponent fibers form 7 to 8% by weight of the mixture and said superabsorbing polymer forms 2.5% by weight of the mixture.

* * * * *